US009383971B2

(12) United States Patent
Kaplinger et al.

(10) Patent No.: US 9,383,971 B2
(45) Date of Patent: Jul. 5, 2016

(54) MOBILIZE WEBSITE USING REPRESENTATIONAL STATE TRANSFER (REST) RESOURCES

(71) Applicant: International Business Machines Corporation, Armonk, NY (US)

(72) Inventors: Todd E. Kaplinger, Raleigh, NC (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/315,372

(22) Filed: Jun. 26, 2014

(65) Prior Publication Data

US 2015/0378684 A1 Dec. 31, 2015

(51) Int. Cl.
*G06F 9/44* (2006.01)
*H04L 29/08* (2006.01)
*G06F 17/30* (2006.01)

(52) U.S. Cl.
CPC *G06F 8/20* (2013.01); *G06F 17/30* (2013.01); *H04L 67/02* (2013.01); *G06F 9/4443* (2013.01)

(58) Field of Classification Search
CPC ......... G06F 8/20; G06F 17/30; G06F 9/4443; H04L 67/02
USPC ....................................................... 717/104
See application file for complete search history.

(56) References Cited

U.S. PATENT DOCUMENTS

| 7,480,858 | B2 | 1/2009 | Chen et al. | |
|---|---|---|---|---|
| 8,302,016 | B2 | 10/2012 | Goto | |
| 8,448,074 | B2 | 5/2013 | Forutanpour et al. | |
| 2003/0200533 | A1* | 10/2003 | Roberts | G06N 5/02 717/124 |
| 2008/0250394 | A1 | 10/2008 | Jones et al. | |
| 2010/0077321 | A1 | 3/2010 | Shen et al. | |
| 2010/0199197 | A1 | 8/2010 | Faletski et al. | |
| 2012/0060087 | A1 | 3/2012 | Jame et al. | |
| 2012/0066601 | A1 | 3/2012 | Zazula et al. | |
| 2013/0205279 | A1* | 8/2013 | Osminer et al. | 717/123 |
| 2014/0026113 | A1* | 1/2014 | Farooqi | 717/107 |
| 2014/0372970 | A1* | 12/2014 | Broussard et al. | 717/106 |
| 2015/0007128 | A1* | 1/2015 | Yu et al. | 717/104 |

FOREIGN PATENT DOCUMENTS

CN 103049271 A 4/2013

OTHER PUBLICATIONS

U.S. Appl. No. 14/315,363 entitled "User Interface Element Adjustment Using Web Analytics" filed Jun. 26, 2014.
U.S. Appl. No. 14/315,367 entitled "Self-Documentation for Representational State Transfer (REST) Application Programming Interface (API)" filed Jun. 26, 2014.
U.S. Appl. No. 14/315,376 entitled "Mobilizing an Existing Web Application" filed Jun. 26, 2014.

(Continued)

*Primary Examiner* — Anna Deng
(74) *Attorney, Agent, or Firm* — Edward J. Wixted, III

(57) ABSTRACT

In an approach for mobilizing a web application, a processor receives a representational state transfer (REST) resource of a web application. A processor analyzes the REST resource to identify a pattern in the REST resource. A processor retrieves a template corresponding to the pattern in the REST resource. A processor generates a mobile web application based, at least in part, on the REST resource and the template.

18 Claims, 3 Drawing Sheets

(56) References Cited

OTHER PUBLICATIONS

U.S. Appl. No. 14/604,806, filed Jan. 26, 2015; Entitled "Mobilizing an Existing Web Application".
Anubavam; "Website to mobile app"; retrived on Jan. 23, 2014 from website: <http://www.anubavam.com/website-to-mobile-app>.
Anonymous; "Method and System for Rendering Simplified Content Mobile Devices"; An IP.com Prior Art Database Technical Disclosure; IPCOM000204076D; IP.com Electronic Publication: Feb. 10, 2011.
Anonymous; "Mobilizing an Existing Web Application: Method of Runtime Code Adaptation", An IP.com Prior Art Database Technical Disclosure; IPCOM000223897D; IP.com Electronic Publication: Dec. 5, 2012.
Anonymous; "Method and System for Automatically Analyzing a Website for Converting to a Mobile Web Application"; An IP.com Prior Art Database Technical Disclosure; IPCOM000223896D; IP.com Electronic Publication: Dec. 5, 2012.
Anonymous, "Mobilizing an Existing Web Application: Method to Optimize REST Calls in Client for a Mobile Environment"; An IP.com Prior Art Database Technical Disclosure; IPCOM000223898D; IP.com Electronic Publication: Dec. 5, 2012.
Apache CXF; "JAX-RS Services Description"; Retrieved on Jan. 22, 2014 from website: <http://cxf.apache.org/docs/jaxrs-services-description.html>.
Beryozkin; "Musings About Web Services"; Sunday, Oct. 2, 2011; Retrieved from website: <http://sberyozkin.blogspot.com/2011/10/describing-json-services-in-web . . . >.
Buddy Media; "Manage and publish social content using Buddy Media"; Retrieved on Jan. 22, 2014 from website: <http://www.salesforcemarketingcloud.com/sem/buddymedia . . . >.
Careveo; "Using json-schema for exploring API servers"; Jun. 30, 2011, Retrieved from website: <http://shane.caraveo.com/2011/06/30/using-json-schema-for-exploring . . . >.
Chen, et al.; "Coordinated data prefetching for web contents"; Elsevier, Science Direct; copyright 2005 Elsevier B.V.; doi: 10.1016/j.comcom.2005.04.003.
Flynn; "IBM Web Experience Factory: Web Experience Factory"; IBM; Retrieved on Jan. 23, 2014 from website: <http://www-10.lotus.com/ldd/pfwiki.nsf/dx/IBM_Web_Experience_Factory . . . >.
Forge; "The fastest way to build applications, share your software, and enjoy doing it"; JBoss Forge; Retrieved on Jan. 23, 2014 from website: <http://forge.jboss.org/?_sscc=t>.
Gerasika; "How to Convert JSON to XML Using ANTLR"; GerixSoft, Saturday, Jun. 11, 2011; Retrieved from website: <http://www.gerixsoft.com/blog/xslt/json2xml2>.
Gerasika; "How to Convert JSON to XML Using XSLT 2.0"; GerixSoft, Saturday, Jul. 3, 2010; Retrieved from website: <http://www.gerixsoft.com/blog/xslt/json2xml7>.
Golega et al.; "Generating Web Applications from Process Models"; ICWE '06 Workshops; Jul. 10-14, 2006; Palo Alto, CA; Copyright 2006 ACM 1-59593-435-09/06/07.
Google Analytics; "Analytics Collection"; last updated Jul. 9, 2013; Retrieved from website: <https://developers.google.com/analytics/devguides/collection/>.
Giunipero; "Creating a Simple Web Application Using MySQL Database"; Retrieved on Jan. 23, 2014 from website: <https://netbeans.org/kb/docs/web/mysql-webapp.html>.
Guest Author; "Paint by Numbers: Guided Design Through Web Analytics"; Dec. 9, 2010; Retrieved from website: <http://blog.sigmamarketing.com/2010/12/paint-by-numbers-guided-design . . . >.
IBM; "IBM Security AppScan"; IBM Software; Retrieved on Jan. 23, 2014 from website: <http://www-03.ibm.com/software/products/en/appscan>.
Jersey; "Extended WADL example for JSON"; Retrieved on Jan. 22, 2014 from website: <http://jersey.576304.n2.nabble.com/Extended-WADL-example-for-JSON>.
Kumar et al.; "A Predicted Region based Cache Replacement Policy for Location Dependent Data in Mobile Environment"; I.J. Communications; Network and System Sciences, 2008; 1: 1-103; Copyright 2008 SciRes.
Paolini; "Web Analytics & Search: What's Happening to My Traffic?"; Jun. 8, 2010; MPThree Consulting Inc.; Retrieved from website: <http://mpaolini.com/web-analytics-the-basics>.
PR Newswire Services; "New Wily 6 Solution Delivers Unmatched End-to-End Web Application Management"; Source is Wily Technology, Inc.; Retrieved on Jan. 23, 2014 from website: <http://www.prnewswire.com/news-releases/new-wily-6-solution-delivers . . . >.
Programmable Web; REST API Design: Put the "Type" in "Content-Type"; Nov. 18, 2011; Retrieved from website: <http://blog.programmableweb.com/2011/11/18/rest-api-design-putting . . . >.
Stack Overflow; "Create and link XSD to WADL"; Retrieved on Jan. 22, 2014 from website: <http://stackoverflow.com/questions/6168573/create-and-link-xsd-to-a . . . >.
Stack Overflow; "Is it possible to convert web application to mobile application?"; Retrieved on Jan. 23, 2014 from website: <http://stackoverflow.com/questions/743348/is-it-possible-to-convert . . . >.
Tiggzi, "Tiggzi—Features"; Product website; Retrieved on Jan. 23, 2014 from website: <https://web.archive.org/web/20130329010933/http://tiggzi.com/features#>.
Veracode; "Vulnerability Scanning Tools"; Copyright 2006-2013 Veracode Inc.; Burlington, MA; Retrieved from website: <http://www.veracode.com/security/vulnerability-scanning>.
Verborgh; "Easy restfull JAX-RS webservices and extended WADL on Glassfish v3 (using ant.)"; Nov. 21, 2009; Retrieved from website: <http://www.verborgh.be/articles/2009/11/21/easy-restfull-jax-rs-webservices . . . >.
Wikipedia; "List of graphical user interface builders and rapid application development tools"; Retrieved on Jan. 23, 2014 from website: <http://en.wikipedia.org/w/index.php?title=List_of_user_interface . . . >.
Wikipedia; "Web log analysis software"; Retrieved on Jan. 22, 2014 from website: <http://en.wikipedia.org/w/index.php?title=Web_log_analysis_software . . . >.
Zucker; "What is "Integrated Analytics"?"; Bridgeline Software; Whitepaper; Copyright 2009 Bridgeline Software Inc.; Woburn, MA.
Machi; "dojox.analytics"; dojo; dojo.analytics—The Dojo Toolkit—Reference Guide; Printed Jan. 22, 2014; <http://dojotoolkit.org/reference-guide/1.7/dojox/analytics.html#dojox- . . . >.
Appendix P: List of IBM Patents or Patent Applications Treated as Related, dated Jun. 26, 2014, 2 pages.
Appendix P: List of IBM Patents or Patent Applications Treated as Related, dated Jan. 26, 2015, 2 pages.
Serwatka, "Building native mobile applications with the eZ Publish REST API", eZ Community Knowledge Base : <http://share.ez.no/learn>, The eZ Publish Community Gateway, Oct. 13, 2011, 38 pages.
Serwatka, Lukasz, "Building mobile browser and hybrid applications with eZ Publish", Jul. 7, 2011, eZ Community Knowledge Base, pp. 1-41, Retrieved from http://share.ez.no/learn/ez-publish/building-mobile-browser-and-hybrid-applications-with-ez-publish/(language)/eng-GB on Oct. 16, 2015.

* cited by examiner

MOBILIZE WEBSITE USING REPRESENTATIONAL STATE TRANSFER (REST) RESOURCES

FIELD OF THE INVENTION

The present invention relates generally to the field of website mobilization, and more particularly to generating a mobile website using representational state transfer (REST) resources.

BACKGROUND OF THE INVENTION

The mobile web refers to access to the Internet from a handheld mobile device, such as a smartphone, connected to a mobile network or other wireless network. Mobile devices can include smartphones, netbooks, tablets, e-books, and other devices with a variety of screen sizes and input capabilities (e.g., touchscreen, mouse, keyboard, etc.).

Representational state transfer (REST) is a set of principles that define how web standards, such as hypertext transfer protocol (HTTP) and uniform resource identifier (URI), are intended to be used. REST is intended to evoke an image of how a well-designed web application behaves: presented with a network of webpages, a user progresses through an application by selecting links, or state transitions, resulting in the next page being transferred to the user and rendered for their use. RESTful applications maximize the use of existing, well-defined interfaces and other built-in capabilities provided by the chosen network protocol, and minimize the addition of new application-specific features.

SUMMARY

Aspects of an embodiment of the present invention disclose a method, computer program product, and computing system for mobilizing a web application. A processor receives a representational state transfer (REST) resource of a web application. A processor analyzes the REST resource to identify a pattern in the REST resource. A processor retrieves a template corresponding to the pattern in the REST resource. A processor generates a mobile web application based, at least in part, on the REST resource and the template.

DETAILED DESCRIPTION

Embodiments of the present invention recognize that attempting to port an existing desktop website to a mobile website can be a complex process, resulting in a less than optimal application for mobile devices. Embodiments of the present invention recognize that building a new mobile web application can present challenges with regards to the best form of representation for a collection of data. Embodiments of the present invention recognize that developers oftentimes cannot understand what mobile user interface (UI) constructs available can best represent their data without trial and error. Embodiments of the present invention recognize that a solution is required to optimize the process of generating a mobile web UI using representational state transfer (REST) resources present within desktop versions of websites.

The present invention will now be described in detail with reference to the Figures.

Figure 1:
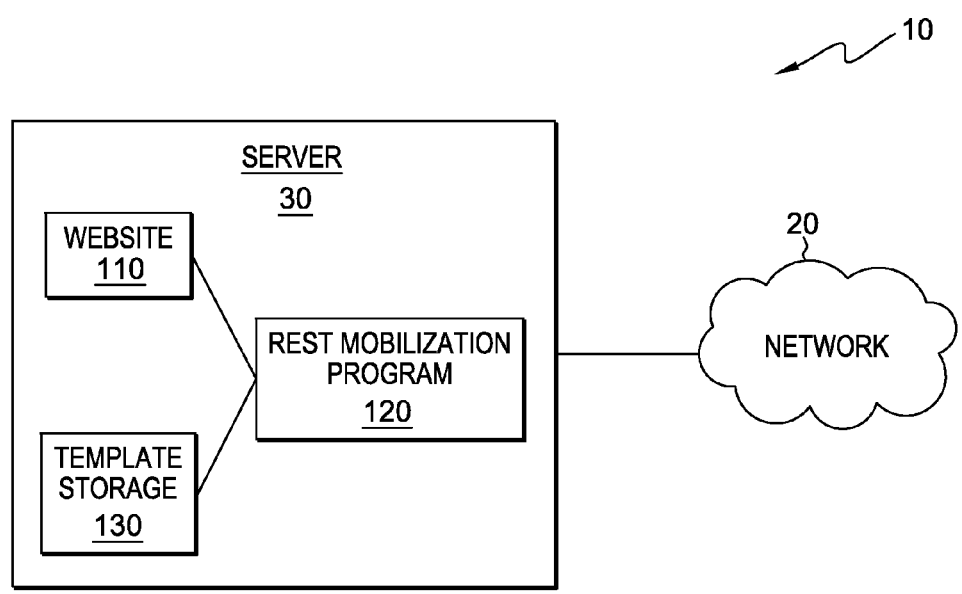
FIG. 1 depicts a diagram of a computing system, in accordance with one embodiment of the present invention.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 30 and network 20. Network 20 may be a local area network (LAN), a wide area network (WAN) such as the Internet, any combination thereof, or any combination of connections and protocols that will support communications between server 30 and computing devices (not shown) attempting to access website 110 on server 30, in accordance with embodiments of the invention. Network 20 may include wired, wireless, or fiber optic connections. Computing system 10 may include additional computing devices, servers, computers, or other devices not shown.

Server 30 may be a management server, a web server, or any other electronic device or computing system capable of processing program instructions, and receiving and sending data. In some embodiments, server 30 may be a laptop computer, tablet computer, netbook computer, personal computer (PC), a desktop computer, or any programmable electronic device capable of communicating with other devices (not shown) via network 20. In other embodiments, server 30 may represent a server computing system utilizing multiple computers as a server system, such as in a cloud computing environment. Server 30 contains website 110, REST mobilization program 120, and template storage 130. Server 30 may include components, as depicted and described in further detail with respect to FIG. 3.

Website 110 is any web document, or collection of web documents, containing information accessible to other computing devices (not shown), through a web browser over network 20. Website 110 may include one or more webpages that include one or more widgets (e.g., JavaScript widgets), page objects, user interface elements, images, RESTful applications, or other elements. A widget is a stand-alone or self-contained application or set of script or code for use within a webpage. In general, website 110 is any website that includes at least one REST resource, capable of being accessed by REST mobilization program 120.

REST mobilization program 120 operates to identify patterns within REST resources of a website, such as website 110. REST mobilization program 120 also operates to generate mobile applications for each REST resource based on a template associated with identified patterns of each REST resource. If multiple REST resources exist, REST mobilization program 120 may further generate a mobile web application catalog for website 110. In one embodiment, REST mobilization program 120 resides on server 30. In other embodiments, REST mobilization program 120 may reside on another server or another computing device, provided mobilization program 120 has access to website 110 and template storage 130.

Template storage 130 may be a repository that may be written to and read by REST mobilization program 120. Templates corresponding to patterns in REST interfaces may be stored to template storage 130. In some embodiments, templates stored to template storage 130 may be created by a user at server 30 using a user interface associated with REST mobilization program 120. In one embodiment, template storage 130 resides on server 30. In other embodiments, template storage 130 may reside on another server or another computing device, provided that template storage 130 is accessible to REST mobilization program 120.

Figure 2:
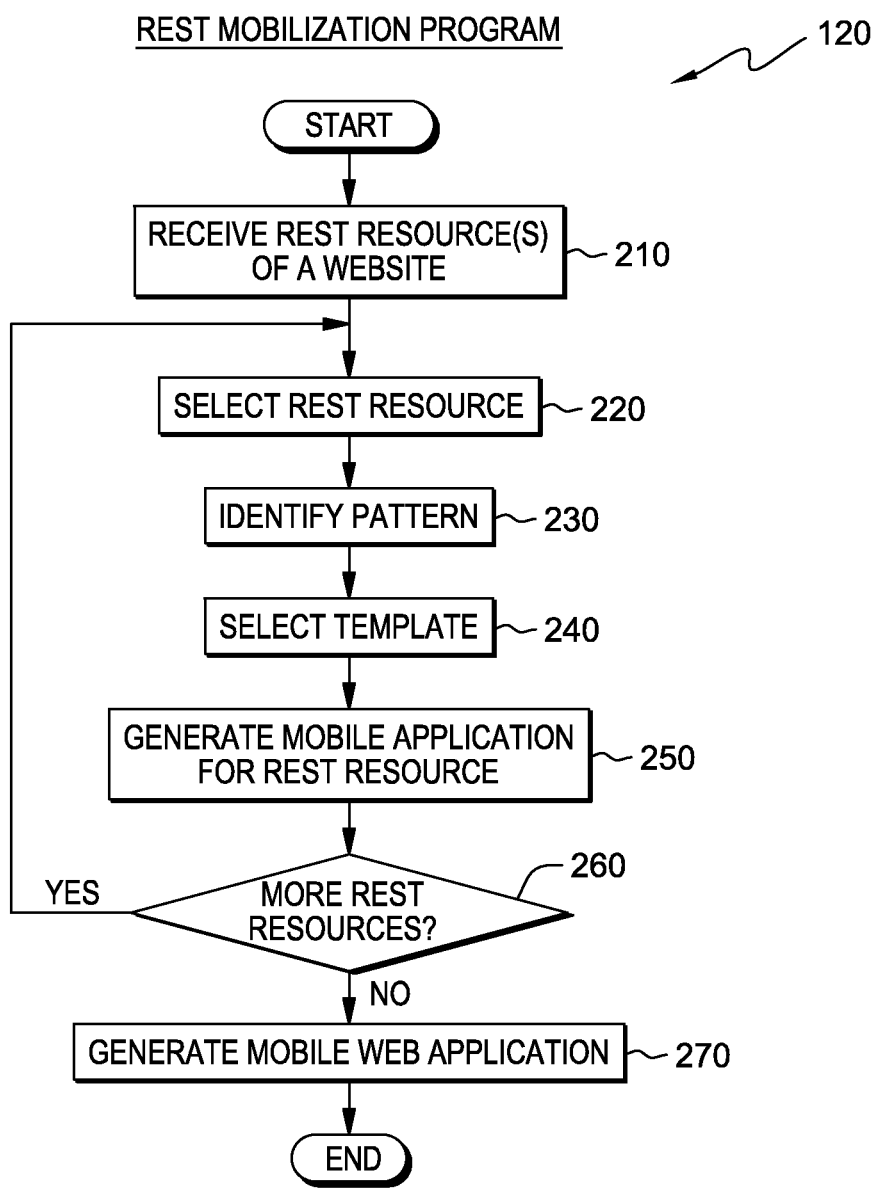
FIG. 2 depicts a flowchart of the steps of a REST mobilization program executing within the computing system of FIG. 1, for identifying patterns within REST resources, and generating mobile web applications based on predefined templates, in accordance with one embodiment of the present invention.

FIG. 2 depicts a flowchart of the steps of REST mobilization program 120, executing within the computing system of FIG. 1, in accordance with an embodiment of the present invention. REST mobilization program 120 operates to generate mobile web applications based on patterns identified from one or more REST resources within a webpage or website, such as website 110, in accordance with one embodiment of the present invention. Using a series of predefined templates, such as templates stored to template storage 130, REST mobilization program 120 can populate data from a REST resource to a template based on the identified pattern(s).

In one embodiment, initially, a web developer or other user may create a webpage or website, such as website 110. Website 110 may be a single webpage or a website comprising a collection of multiple webpages. Website 110 includes one or more REST resources or interfaces. A REST resource is, generally, a resource accessible by a well-defined uniform resource identifier (URI). A URI is a string of characters used to identify a name of a web resource. Such identification enables interaction with representations of the web resource over a network, typically the World Wide Web, using specific protocols. A REST resource may use hypertext transfer protocol (HTTP) methods (e.g., GET, POST, DELETE, etc.) as verbs to perform actions on the REST resource. Multiple REST resource members (e.g., /users/{id}) may make up a REST resource collection (e.g., /users).

Further, a web developer or other user may additionally create and store templates associated with patterns identifiable within a REST resource. For example, one template may be associated with a collection pattern. A collection is a simple model for manipulating a set of resources that includes member items that can be added, removed, updated, and/or deleted. Templates, associated with different patterns, may be stored to a repository, such as template storage 130.

In step 210, REST mobilization program 120 receives one or more REST resources of a webpage or website, such as website 110. In some embodiments, a web developer or other user may input website 110, or another website or webpage, to REST mobilization program 120 through a UI accessible via server 30 or through a UI accessible via another server or another computing device across network 20 (not shown). In some embodiments, REST mobilization program 120 may receive a request to access website 110.

REST mobilization program 120 identifies REST resources of a received webpage or website, such as website 110. In some embodiments, website 110 is a rich Internet application (RIA), and REST mobilization program 120 monitors RIA REST accesses to website 110. RIA is a web application that has many of the characteristics of desktop application software. RIA's are typically delivered via a site-specific browser, browser plugin, extensive use of JavaScript, or virtual machine. In some embodiments, REST mobilization program 120 monitors and analyzes information gathered from an HTTP website access log. In some embodiments, REST mobilization program 120 uses an HTTP OPTION to query the resource and get the web application description language (WADL) definition for the REST resource. A WADL definition is a machine-readable extensible markup language (XML) description of HTTP-based web applications, typically REST web services. WADL definitions model the resources provided by a service and the relationships between them. In some embodiments, REST mobilization program 120 receives a WADL definition associated with website 110, rather than extracting REST resources from website 110.

In step 220, REST mobilization program 120 selects a REST resource from website 110 or the input WADL definition. In embodiments of the present invention, REST mobilization program 120 may iteratively perform each of step 220 through step 250 on REST resources until each REST resource from website 110 has been processed (see decision 260). In some embodiments, REST mobilization program 120 selects each REST resource according to the order listed within the WADL definition. In other embodiments, REST mobilization program 120 may select REST resources based on other criteria.

In step 230, REST mobilization program 120 identifies a pattern from the selected REST resource. In some embodiments, patterns and criteria associated with each pattern may be stored to template storage 130 along with templates associated with each pattern. In some embodiments, REST mobilization program 120 may access template storage 130 to retrieve predefined patterns or sets of patterns for comparison to the selected REST resource. In some embodiments, REST mobilization program 120 compares information retrieved from the REST resource to predefined patterns or sets of patterns. In such a comparison, REST mobilization program 120 may utilize factors, such as, but not limited to, resource names, URIs, associated HTTP methods (e.g., GET, DELETE, OPTIONS, POST, PUT, etc.), members of resources (e.g., "/user/{id}" may be a member of resource "/users"), or other information. Patterns may include, for example, a collection, collection instance, or resource. A collection is a simple model for manipulating a set of resources. Collections have member items that a user can add, remove, update and/or delete.

In one example, REST mobilization program 120 may identify a collection pattern with a resource "users" because the main URI or uniform resource locator (URL) associated with the resource "users," or "/users," is followed by more than one member (i.e., multiple instances of "/users/{id}"). Further, REST mobilization program 120 may identify that each member, for example, the multiple instances of "/users/{id}", corresponds to a collection instance pattern. REST mobilization program 120 may also take into consideration HTTP methods available in associating one or more patterns with a REST resource. In some embodiments, REST mobilization program 120 may also take into consideration the types of data associated with the REST resource, and the organizational structure associated with that data, such as lists, tables, amount of information, etc.

In step 240, REST mobilization program 120 selects at least one template for the REST resource, based on the identified pattern(s). In some embodiments, patterns are associated with templates and stored to a repository, such as template storage 130, for access by REST mobilization program 120. Each template corresponds to a particular pattern, such that data designed for access in a desktop environment may be more easily accessible on a mobile device, such as a tablet or smartphone. Each template may be, for example, a widget or hypertext markup language (HTML) snippet. Templates may cause detailed sets of information to be displayed such that only certain fields are initially displayed, touchscreen-friendly selection/command methods may be deployed, and/or methods of organization may vary based on each identified pattern. In some embodiments, templates are designed to operate using a model-view-controller (MVC) software pattern for implementing the user interface within the mobile device or tablet. MVC separates internal representations of information from the way information is presented to or accepted from a user. The model notifies associated views and controllers where there has been a change in its state. This notification allows views to update their presentation, and controllers to change the set of commands available to a user. In embodiments of the present invention, the model may be a REST resource of website 110. A view generates an output representation to the user, based on information received from the model and/or view. A controller sends commands to the model to update the model's state, for example, due to use of an available HTTP method. A controller may also be capable of sending commands to the view to change the view's presentation of the model.

A template for an instance of a collection or for a single item may yield a form. Form fields may be included within the selected template based on their organizational structure within the instance data, or by other organizational means. In some embodiments, each form field may be extracted from the resultant REST calls, or from any schemas defined for the REST API. A schema is a way to define the structure, content, and to some extent, the semantics of data. In some embodiments, a template may designate form field labels, or another form field indicator, with names extracted from schema fields corresponding to the selected data.

In step 250, REST mobilization program 120 generates a mobile application for the selected REST resource. In some embodiments, REST mobilization program 120 populates the selected template with data extracted from the selected REST resource. Embodiments of REST mobilization program 120 populate the selected template according to methods previously described, utilizing applicable schemas, data, formats, and other information based on the selected template and the information the selected REST resource represents. For example, REST mobilization program 120 may utilize a template consisting of UI components for a scrollable view and list, with buttons to add and remove items from the list. Such a list may be tied to, or otherwise associated with a data model for the REST resource. In some embodiments, a populated template may include a list of services, wherein each service includes a URI of the REST resource, and HTML method (e.g., GET, DELETE, POST, etc.), and the internet media type of the resulting document.

In decision 260, REST mobilization program 120 determines whether there are more REST resources within website 110. REST mobilization program 120 may determine whether there are more REST resources within website 110 by accessing website 110 and identifying the existence of additional REST resources by means similar to the identification method discussed with regard to step 210. If REST mobilization program 120 determines there are more REST resources within website 110 (decision 260, yes branch), REST mobilization program proceeds to select an additional REST resource (step 220).

If REST mobilization program 120 determines there are not more REST resources within website 110 (decision 260, no branch), REST mobilization program 120 generates a mobile web application, or mobile web application catalogue (step 270). A mobile web application catalogue may be a combination of mobile applications, such as mobile applications generated by step 250. In some embodiments, the mobile web application catalogue may be integrated into website 110, such that mobile devices or tablets are directed to the mobile catalogue. In other embodiments, the mobile web application may be a native mobile application stored as an application downloadable from an app store. Embodiments of REST mobilization program 120 may provide UI options to navigate between the multiple mobile applications present within a single mobile web application catalogue. In some embodiments, REST mobilization program 120 may detect the type of device accessing website 110, and adjust the presentation of website 110 based on the type of device, For example, REST mobilization program 120 may utilize browser detection methods, such as JavaScript, to determine the type of device a user is using to access website 110, and website 110 may present a desktop version, mobile version created by REST mobilization program 120, or other versions created by REST mobilization program 120 for other types of devices.

Figure 3:
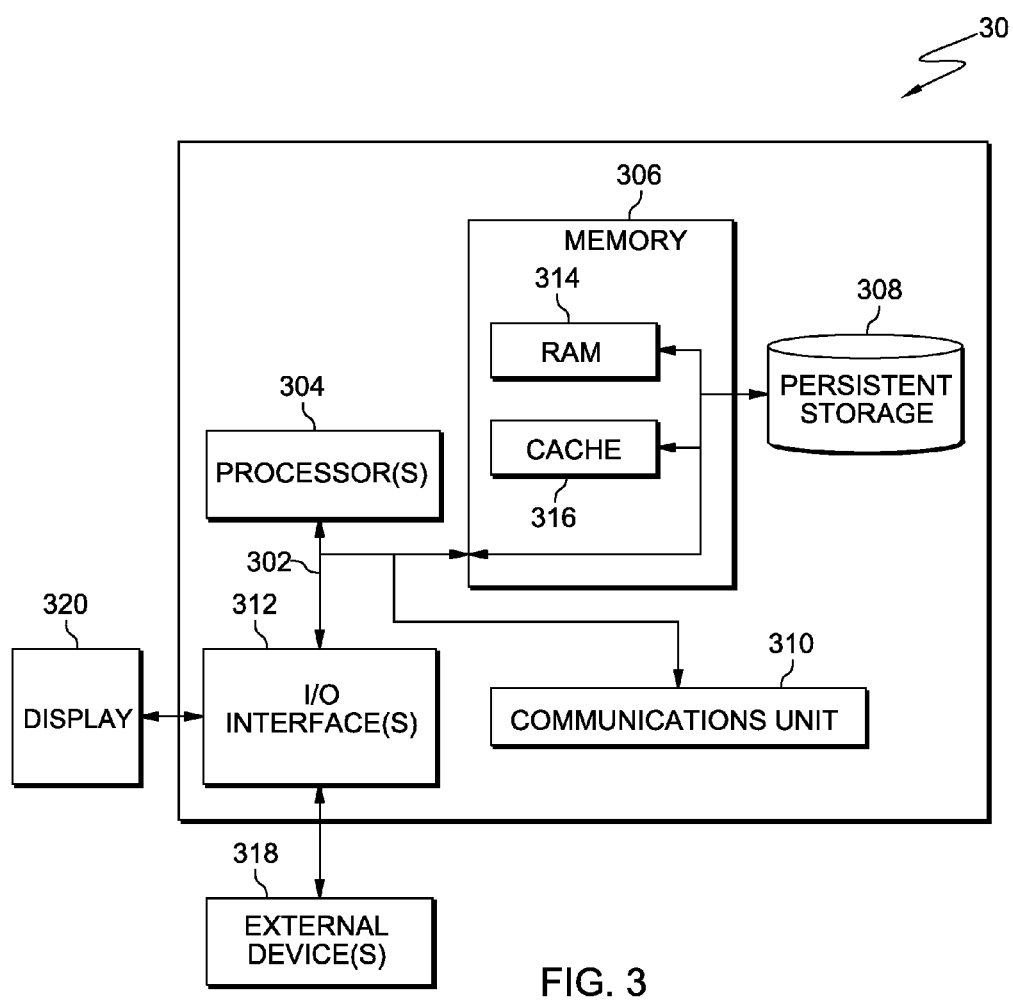
FIG. 3 depicts a block diagram of components of the server of FIG. 1, in accordance with one embodiment of the present invention.

FIG. 3 depicts a block diagram of components of server 30 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 30 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Website 110, REST mobilization program 120, and template storage 130 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Website 110, REST mobilization program 120, and template storage 130 may be downloaded to persistent storage 308 through communications unit 310.

I/O interface(s) 312 allows for input and output of data with other devices that may be connected to server 30. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., website 110, REST mobilization program 120, and template storage 130, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for mobilizing a web application, the method comprising:
   receiving a representational state transfer (REST) resource of a web application, wherein the web application presents data of the REST resource of the web application in a first form;
   analyzing, by one or more processors, the REST resource to identify a pattern in the REST resource;
   determining, by one or more processors, that the identified pattern in the REST resource corresponds to a first pattern, wherein the first pattern is a predetermined pattern that is associated with a template, and wherein the template utilizes a model-view-controller (MVC) software pattern and the template is configured to present the data of the REST resource of the web application in a second form, wherein the second form is accessible to mobile devices;
   retrieving, by one or more processors, the template;
   extracting, by one or more processors, a schema defined for the REST resource, wherein the schema includes a field with a name corresponding to a type of the data of the REST resource; and
   generating, by one or more processors, a mobile web application that presents the data of the REST resource of the web application in the second form based, at least in part, on the REST resource and the template, wherein the mobile web application includes a field name indicator corresponding to the type of data of the REST resource, and wherein the field name indicator is the name corresponding to the type of data of the REST resource from the extracted schema.

2. The method of claim 1, wherein analyzing the REST resource to identify a pattern in the REST resource comprises:
   accessing, by one or more processors, a web application description language (WADL) definition for the REST resource; and
   analyzing, by one or more processors the WADL definition for the REST resource to identify the pattern in the REST resource.

3. The method of claim 1, wherein generating a mobile web application that presents the data of the REST resource of the web application in the second form based, at least in part, on the REST resource and the template comprises:
   retrieving, by one or more processors, data from the REST resource; and
   populating, by one or more processors, the template using the data retrieved from the REST resource.

4. The method of claim 1, wherein the pattern is identified based on a set of one or more hypertext transfer protocol methods associated with the REST resource.

5. The method of claim 1, wherein the mobile web application is a native mobile application.

6. A computer program product for mobilizing a web application, the computer program product comprising:
   one or more computer readable storage media and program instructions stored on the one or more computer readable storage media, the program instructions comprising:
   program instructions to receive a representational state transfer (REST) resource of a web application, wherein the web application presents data of the REST resource of the web application in a first form;
   program instructions to analyze the REST resource to identify a pattern in the REST resource;
   program instructions to determine that the identified pattern in the REST resource corresponds to a first pattern, wherein the first pattern is a predefined pattern that is associated with a template, and wherein the template utilizes a model-view-controller (MVC) software pattern and the template is configured to present the data of the REST resource of the web application in a second form, wherein the second form is accessible to mobile devices;
   program instructions to retrieve the template;
   program instructions to extract a schema defined for the REST resource, wherein the schema includes a field with a name corresponding to a type of the data of the REST resource; and
   program instructions to generate a mobile web application that presents the data of the REST resource of the web application in the second form based, at least in part, on the REST resource and the template, wherein the mobile web application includes a field name indicator corresponding to the type of data of the REST resource, and wherein the field name indicator is the name corresponding to the type of data of the REST resource from the extracted schema.

7. The computer program product of claim 6, wherein program instructions to analyze the REST resource to identify a pattern in the REST resource comprise:
   program instructions to access a web application description language (WADL) definition for the REST resource; and
   program instructions to analyze the WADL definition for the REST resource to identify the pattern in the REST resource.

8. The computer program product of claim 6, wherein program instructions to generate a mobile web application that presents the data of the REST resource of the web application in the second form based, at least in part, on the REST resource and the template comprise:
   program instructions to retrieve data from the REST resource; and
   program instructions to populate the template using the data retrieved from the REST resource.

9. The computer program product of claim 6, wherein the pattern is identified based on a set of one or more hypertext transfer protocol methods associated with the REST resource.

10. The computer program product of claim 6, wherein the mobile web application is a native mobile application.

11. The computer program product of claim 6, wherein the template is selected from the group consisting of: a widget and a hypertext markup language (HTML) snippet.

12. The computer program product of claim 6, wherein:
   the pattern is a collection pattern, wherein the collection pattern has a plurality of items that a user can add, remove, update, and delete; and the program instructions to analyze the REST resource to identify the pattern in the REST resource comprise:
program instructions to determine that a uniform resource identifier (URI) associated with a resource is followed by more than one member.

13. The computer program product of claim 6, wherein the pattern is identified based on a factor selected from the group consisting of: resource names, uniform resource identifiers (URIs), and members of resources.

14. The computer program product of claim 6, wherein at least one aspect of the second form is selected from the group consisting of: touchscreen selection methods deployed; fewer than all fields are initially displayed; and organizational variations.

15. A computer system for mobilizing a web application, the computer system comprising:
one or more computer processors, one or more computer readable storage media, and program instructions stored on the computer readable storage media for execution by at least one of the one or more processors, the program instructions comprising:
program instructions to receive a representational state transfer (REST) resource of a web application, wherein the web application presents data of the REST resource of the web application in a first form;
program instructions to analyze the REST resource to identify a pattern in the REST resource;
program instructions to determine that the identified pattern in the REST resource corresponds to a first pattern, wherein the first pattern is a predefined pattern that is associated with a template, and wherein the template utilizes a model-view-controller (MVC) software pattern and the template is configured to present the data of the REST resource of the web application in a second form, wherein the second form is accessible to mobile devices;
program instructions to retrieve the template;
program instructions to extract a schema defined for the REST resource, wherein the schema includes a field with a name corresponding to a type of the data of the REST resource; and
program instructions to generate a mobile web application that presents the data of the REST resource of the web application in the second form based, at least in part, on the REST resource and the template, wherein the mobile web application includes a field name indicator corresponding to the type of data of the REST resource, and wherein the field name indicator is the name corresponding to the type of data of the REST resource from the extracted schema.

16. The computer system of claim 15, wherein program instructions to analyze the REST resource to identify a pattern in the REST resource comprise:
program instructions to access a web application description language (WADL) definition for the REST resource; and
program instructions to analyze the WADL definition for the REST resource to identify the pattern in the REST resource.

17. The computer system of claim 15, wherein program instructions to generate a mobile web application that presents the data of the REST resource of the web application in the second form based, at least in part, on the REST resource and the template comprise:
program instructions to retrieve data from the REST resource; and
program instructions to populate the template using the data retrieved from the REST resource.

18. The computer system of claim 15, wherein the pattern is identified based on a set of one or more hypertext transfer protocol methods associated with the REST resource.

\* \* \* \* \*